United States Patent
Goel et al.

(10) Patent No.: US 10,057,666 B2
(45) Date of Patent: Aug. 21, 2018

(54) DIRECTION-SWITCHABLE TRANSPONDERS

(71) Applicant: Facebook, Inc., Menlo Park, CA (US)

(72) Inventors: Nitin Kumar Goel, Mountain View, CA (US); Satyajeet Singh Ahuja, Cupertino, CA (US); Gayathrinath Nagarajan, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/375,021

(22) Filed: Dec. 9, 2016

(65) Prior Publication Data

US 2018/0167704 A1    Jun. 14, 2018

(51) Int. Cl.
*H04Q 11/00* (2006.01)
*H04J 14/02* (2006.01)

(52) U.S. Cl.
CPC ...... *H04Q 11/0066* (2013.01); *H04J 14/0212* (2013.01); *H04Q 2011/0016* (2013.01); *H04Q 2011/0081* (2013.01)

(58) Field of Classification Search
CPC .......... H04Q 11/0005; H04Q 11/0066; H04Q 2011/0016; H04Q 2011/0032; H04Q 2011/0081; H04J 14/0227; H04J 4/0212
See application file for complete search history.

(56) References Cited

U.S. PATENT DOCUMENTS

| | | | |
|---|---|---|---|
| 2006/0256712 A1* | 11/2006 | Imajuku | H04J 14/0284 370/218 |
| 2014/0161449 A1* | 6/2014 | Doerr | H04J 14/0257 398/49 |

OTHER PUBLICATIONS

U.S. Appl. No. 15/681,292 by Goel, N. et al., filed Aug. 18, 2017.
U.S. Appl. No. 15/607,113 by Goel, N. et al., filed May 26, 2017.
U.S. Appl. No. 15/647,191 by Goel, N. et al., filed Jul. 11, 2017.

* cited by examiner

*Primary Examiner* — Ted Wang
(74) *Attorney, Agent, or Firm* — Van Pelt, Yi & James LLP

(57) ABSTRACT

A direction-switchable transponder of a high speed communications network, e.g., an fiber optic data communications network, is capable of dynamically reversing the data traffic flow of its various communications channels in response to a signal. The signal can specify a number of channels, a channel map, or a required bandwidth. The direction-switchable transponder can receive a signal relating to network bandwidth requirements; select, based on the received signal, one or more fiber optic channels for reversing direction of flow of network traffic; and dynamically and automatically reconfigure the selected fiber optic signal to reverse direction of flow of network traffic. By responding to asymmetric bandwidth requirements, the direction-switchable transponder uses high speed communications network lines more efficiently.

21 Claims, 5 Drawing Sheets

DIRECTION-SWITCHABLE TRANSPONDERS

BACKGROUND

Social networking systems enable a very large number of users (e.g., a billion users or more) to share data worldwide. To support this data sharing, the social networking systems have multiple data centers that are distributed around the world. The multiple data centers enable the data to be distributed worldwide, e.g., to back up data or to store data near where the data will be consumed. Each of these data centers typically has a very large number of server computing devices. The server computing devices may be assigned various roles, e.g., compute, data storage, web site, etc.

Data centers may be built and geographically located based on various requirements and constraints. Data centers in developed countries can be large, where power and land are available. In countries where power and land are less available or there is a regulation concern, data centers may be smaller. Because larger data centers are easier to manage and provide superior scalability, they are preferred and tend to be built in a handful of locations. On the other hand, for flexibility and nimbleness, small data centers are preferred and they are built in many places wherever there are users of the social networking system. As a result, the infrastructure for a social networking systems may have various sizes of data centers that are geographically dispersed.

Content providers and, e.g., streaming video content providers, similarly build large data centers and can locate them near consumers of their content. They may also use services of content delivery networks to deliver content. These content delivery networks also have geographically dispersed data centers.

To exchange large amounts of data between data centers, the owners or operators of the data centers typically use high speed data communications links between the data centers, e.g., fiber optic communications links. High speed communications links (also referred to herein as "lines"), e.g., fiber optic links, can have two physical communications lines (e.g., fibers) that together form a circuit. One of these lines is typically used to transmit data and the other line is typically used to receive data. This is commonly known as full duplex communications.

For many content providers, e.g., social networking systems, streaming video content providers, etc., the bandwidth needs can often be asymmetric. As an example, when a user requests content, the messages forming the request can be quite small, e.g., a uniform resource locator ("URL"), but the response can be very large, e.g., multiple images or frames of video. In such cases, one of the two physical communications lines forming the circuit is lightly utilized (e.g., to transmit requests) but the other communications line is very heavily utilized (e.g., to receive responses to the requests). However, at other times, the bandwidth needs can be more symmetric. As an example, when backing up data to other data centers, both communications lines may be used to exchange data. Because of the variable nature of bandwidth needs, physical network providers (e.g., telco companies) typically provide symmetric capacity. As a result, the use of some communications lines is suboptimal: although capacity exists, it is configured to be used in a particular direction only, e.g., the "wrong" direction. Reconfiguring the lines can be a laborious and expensive process that requires downtime on the entire communications circuit, especially when the reconfiguration must be done regularly, e.g., to respond to the variable bandwidth.

DETAILED DESCRIPTION

Figure 1:
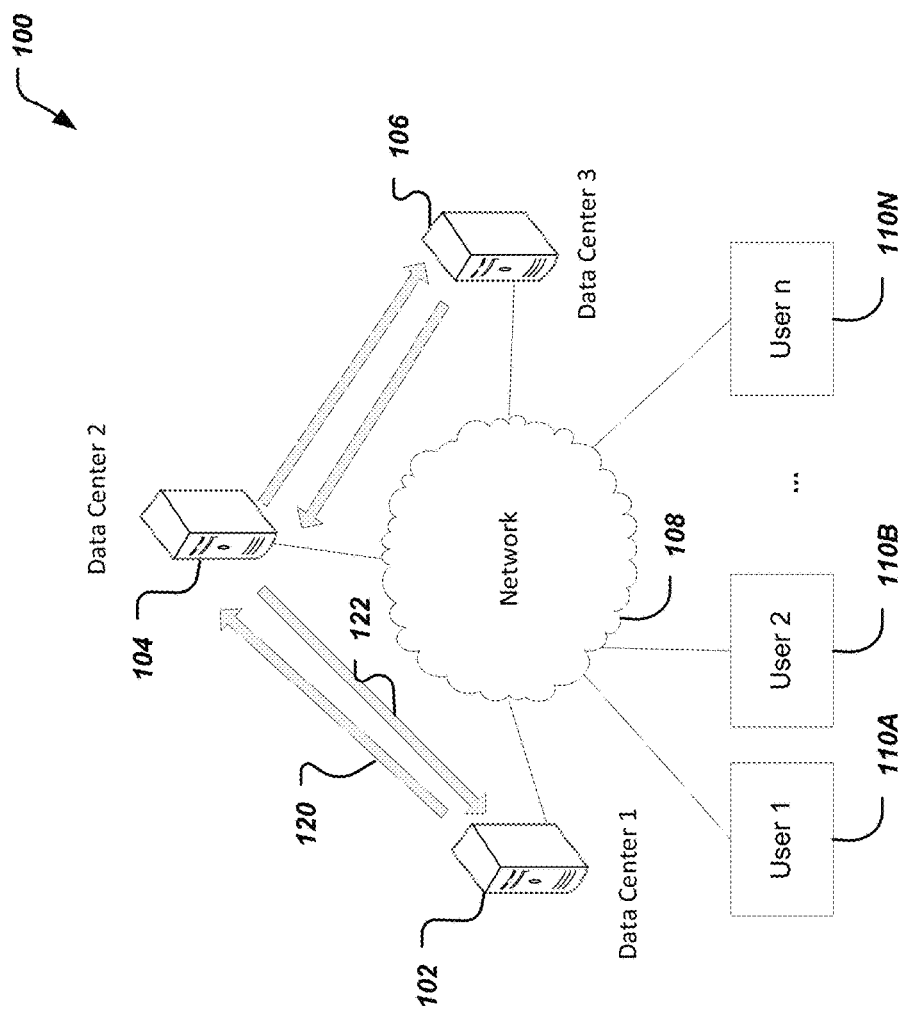
FIG. 1 is a block diagram illustrating an environment in which a direction-switchable transponder may be employed, consistent with various embodiments.

The disclosure is directed to a direction-switchable transponder. In optical communications networks, e.g., fiber optic networks, a transponder can convert or generate various wavelengths of light that is propagated along a fiber optic cable. Various light wavelengths can be used to transmit or receive data. In dense wavelength division multiplexing (DWDM), which is a physical optical layer protocol for exchanging data, multiple "channels" are used to transmit or receive data in parallel on a single fiber or on two fibers ("fiber pair"). Typically, most or all channels on a first fiber of a circuit are used to transmit data and most or all channels on a second fiber of the circuit are used to receive data. Each channel uses a different wavelength of light. Presently, up to 96 channels can co-exist on a single pair of fibers. The number of channels can vary across manufacturers of transponders or other optical networking equipment. Transponders are typically configured at installation time to transmit or receive data on channels in a particular direction (e.g., between a sender and a receiver), which effectively "clamps" bandwidth in a particular direction based on how many channels are configured to transmit data in that particular direction. When symmetric bandwidth needs are anticipated, an equal number of channels may be configured in each direction of a fiber optic cable: e.g., 48 channels in one direction and 48 channels in the opposite direction. When asymmetric bandwidth needs are anticipated, an unequal number of channels may be configured in each direction: e.g., 12 channels for receiving requests in one direction of a fiber optic cable 36 channels for transmitting responses in the opposite direction of the fiber optic cable, and 48 channels for transmitting responses on a different fiber optic cable or the same fiber optic cable. Thus, there may be a total of 12 channels for requests and 84 channels for responses.

The direction-switchable (also referred to sometimes as direction-modifiable) transponder is capable of receiving a signal and dynamically and automatically reconfiguring channels in response to that signal. The signal can be received via a "back channel," e.g., via Ethernet, I2C, or indeed any signaling mechanism. The signal can also be received via one of the DWDM channels, e.g., a channel reserved for signaling various communications equipment that are part of the data communications network. The signal can indicate a change in bandwidth needs. In various embodiments, the signal can indicate how many channels to assign to a particular direction, which channels to assign to a particular direction, or how much bandwidth is presently required or anticipated to be required in a particular direction.

In response to receiving the signal, the direction-switchable transponder reconfigures its channels. If the received signal specifies the number of channels to assign to a particular direction, the direction-switchable transponder determines which channels need to be reconfigured and automatically reconfigures those channels. As an example, the direction-switchable transponder may attempt to reconfigure the fewest number of channels or channels that are presently under-utilized. In various embodiments, the direction-switchable transponder may communicate the reconfiguration to other direction-switchable transponders on the same circuit so that those transponders can appropriately reconfigure themselves to send or receive data.

If the received signal specifies which channels to assign to a particular direction, the direction-switchable transponder reconfigures those channels as specified. In various embodiments, the direction-switchable transponder may communicate the reconfiguration to other direction-switchable transponders on the same circuit so that those transponders can appropriately reconfigure themselves to send or receive data.

If the received signal specifies how much bandwidth to provide in a particular direction, the direction-switchable transponder computes how many channels are required to satisfy that request and then automatically reconfigures that many number of channels. The direction-switchable transponder may attempt to reconfigure the fewest number of channels or channels that are presently under-utilized. In various embodiments, the direction-switchable transponder may communicate the reconfiguration to other direction-switchable transponders on the same circuit so that those transponders can appropriately reconfigure themselves to send or receive data.

In various embodiments, the direction-switchable transponder suspends communications on the channels selected for reconfiguration before the reconfiguration. After the direction-switchable transponder reconfigures those channels, it can resume communications on the selected channels. When a channel is suspended, the direction-switchable transponder or other networking device can redirect communications to other available channels.

In some embodiments, a transponder (or other component of the networking system described herein) may receive a signal in a first wavelength and transmit the received signal in a second, different, wavelength, e.g., to avoid contentions.

Although the word "transponder" is used herein, one skilled in the art that various equivalent devices or other components can be employed to perform the same or similar functionality, e.g., switches, couplers, etc.

Environment

Turning now to the figures, FIG. 1 is a block diagram illustrating an environment 100 in which the direction-switchable transponder may operate. One or more data centers 102, 104, and 106 may be interconnected via a network 108 (e.g., the Internet). Users, e.g., users 110A, 1106, and 110N, may access data stored at the data centers. The data center may respond to the request immediately, may redirect the request to a different data center, or may download the requested data from the different data center and respond to the request. As an example, suppose User 1 110A requests content from a social networking system or a video streaming service. A server that initially receives the request may direct the request to Data Center 1 102 because that data center is geographically located closest to User 1 110A. As is known in the art, by directing user requests to data centers that are geographically located closest to them, the number of network hops can be reduced and further responses can be rapidly communicated to the users. If the requested content is not available at Data Center 1 102, request can be forwarded to a different data center that stores the content, e.g., Data Center 2 104. However, because of the additional network hops between User 1 110A and Data Center 2 104 (as compared to Data Center 1 102), the content may arrive slowly. The user may notice sluggish performance, stops in video, etc. To reduce these issues, Data Center 1 102 may employ high speed communications lines 120 and 122 to quickly download the requested content from Data Center 2 104 and then respond to the user request. The high speed communications lines 120 and 122 can be fiber optic communications lines or indeed any communications lines that offer very high bandwidth and throughput.

Figure 2A:
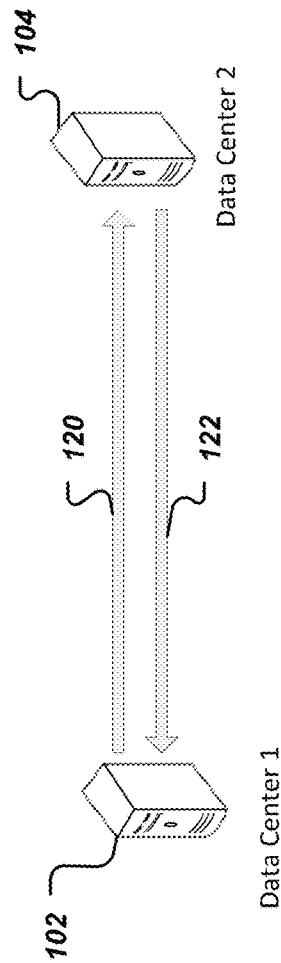
FIGS. 2A, 2B, 2C, and 2D are block diagrams illustrating aspects of high speed communications lines, consistent with various embodiments.
Figure 2B:
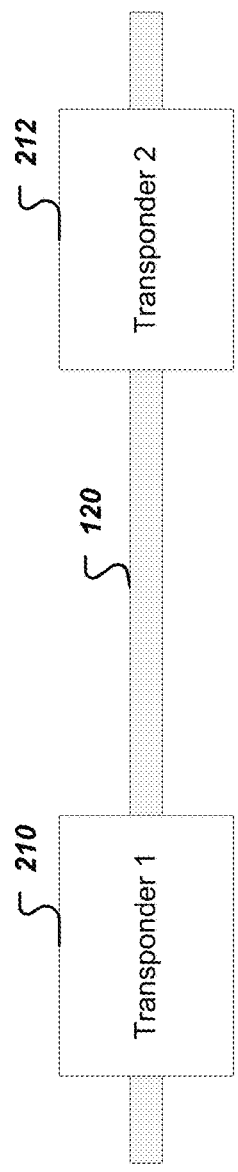

FIGS. 2A, 2B, 2C, and 2D are block diagrams illustrating aspects of high speed communications lines, consistent with various embodiments. According to FIG. 1A, Data Center 1 102 is communicably coupled, via high speed communications lines 120 and 122 that together form a circuit, to Data Center 2 104. In some embodiments, the high speed communications lines 120 and 122 may together be a fiber optic communications pair. FIG. 2B illustrates a close-up view of high speed communications line 120, which includes direction-switchable transponder 1 210 and direction-switchable transponder 2 212. High speed communications line 122 may also have similar transponders. As previously described, the transponders can dynamically reconfigure its channels, e.g., based on a received signal, to send or receive data in either direction. The transponders can receive the reconfiguration signals via one of the channels or a back channel (not illustrated).

Figure 2C:
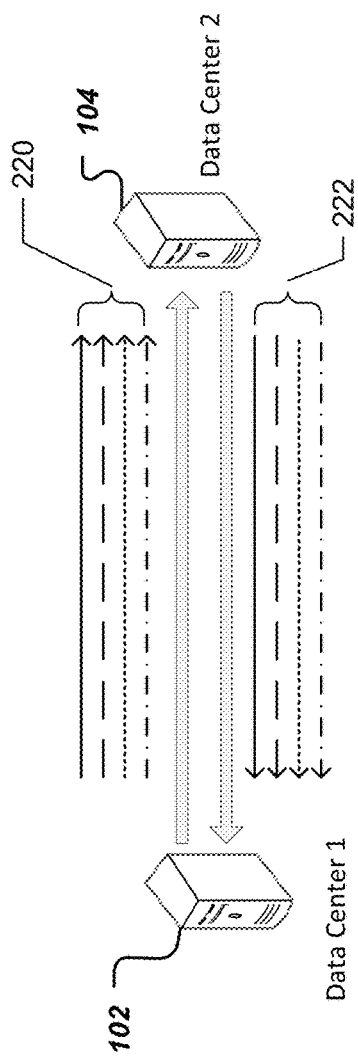
Figure 2D:
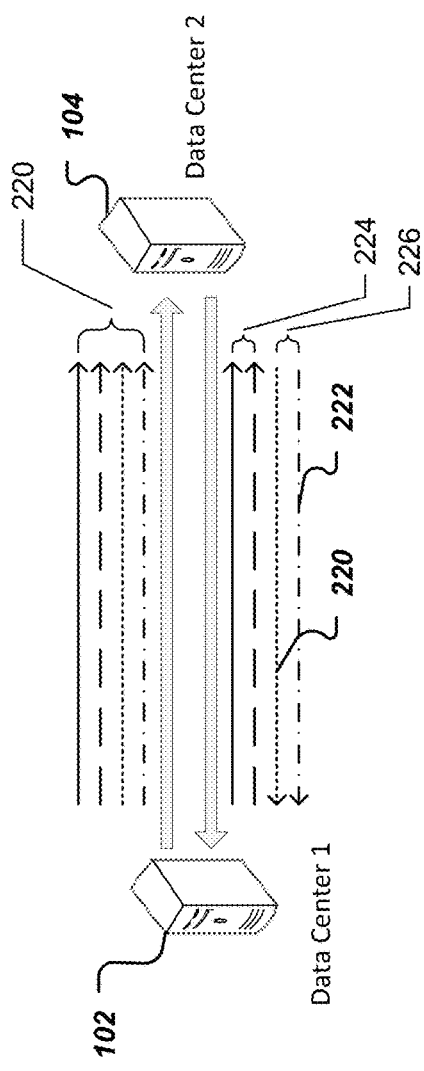

In FIG. 2C, signals on four wavelengths 220 travel in one direction (data center 1 102 to data center 2 104) and signals on four wavelengths 222 travel in the opposite direction (data center 2 104 to data center 1 102). This configuration illustrates a symmetric configuration because there are four wavelengths in each direction (and each wavelength carries approximately same amount of data). Although the signals are illustrated as traveling on different fiber optic cables, they could also be configured to travel on the same fiber optic cable. When asymmetric bandwidth is required, the system can be dynamically and automatically reconfigured, e.g., as is illustrated in FIG. 2D. Signals on six wavelengths travel in one direction from data center 1 102 to data center 2 104 (signals on four wavelengths 220 and signals on two wavelengths 224) and signals on two wavelengths 226 travel in the opposite direction (data center 2 104 to data center 1 102). This configuration illustrates an asymmetric configuration because there are six wavelengths in a first direction and two wavelengths in the opposite direction and so the first direction has three times the bandwidth of the opposite direction.

Figure 3:
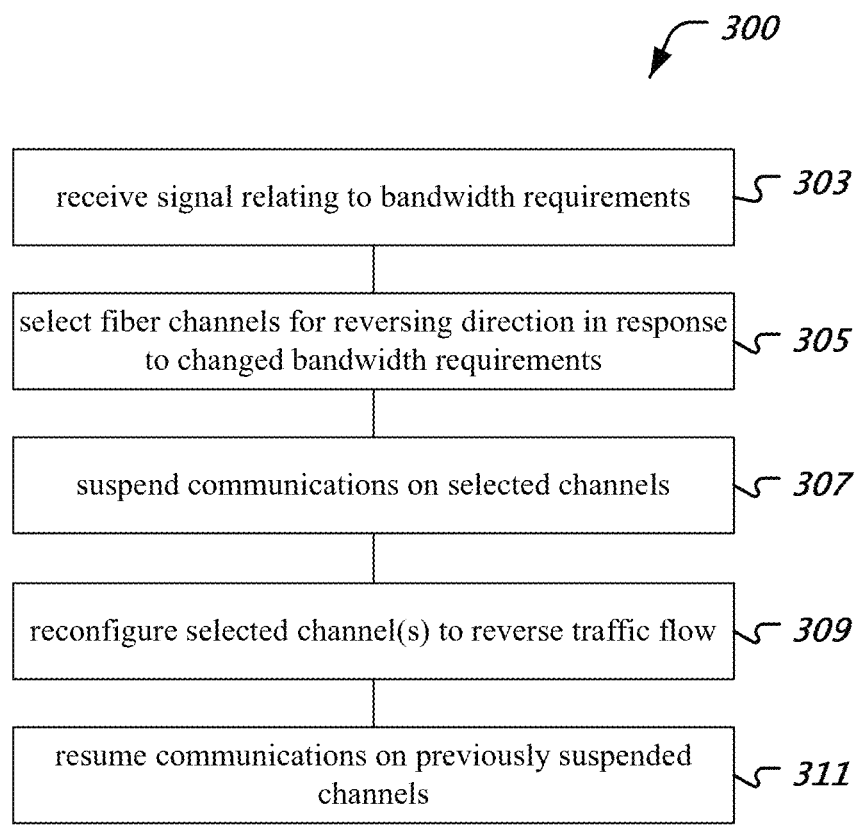
FIG. 3 is a flow diagram illustrating processing of a reconfiguration signal, consistent with various embodiments.

FIG. 3 is a flow diagram illustrating processing of a reconfiguration signal, consistent with various embodiments. At block 303 of the illustrated routine 300, the routine receives a signal relating to bandwidth requirements. In various embodiments, the signal can be received via a "back channel" or via an optical channel and can indicate a change in bandwidth needs, e.g., how many channels to assign to a particular direction, which channels to assign to a particular direction, or how much bandwidth is presently required or anticipated to be required in a particular direction.

At block 305, the routine selects fiber channels for reversing direction in response to changed bandwidth requirements. As examples, the routine may attempt to minimize the number of channels whose direction is to be reversed, may simply assign the channels that are indicated in the received signal, or may reverse direction for channels that are presently under-utilized. The routine may also transmit a signal to a transponder in communication with the computing device at which the routine is executing, e.g., a transponder on the other end of the communications link indicating which channels to reconfigure. (Not illustrated.) In various embodiments, the transmitted signal may simply provide a configuration map indicating which channels are to be employed in which direction. In various embodiments, the channels can be specified as nominal numbers (e.g., channel 0, channel 1, . . . channel 95) or as wavelengths.

At block 307, the routine suspends communications on the channels that are selected for reconfiguration. In various embodiments, when communications are suspended on a channel, devices attempting to communicate via that channel may move to a different channel, e.g., automatically, because of timeouts. Alternatively, those devices may be requested to move to a different channel.

At block 309, the routine reconfigures the selected channel(s) to reverse the direction of data traffic flows. By reversing the directions, additional (or fewer) channels may be assigned to carry traffic in a particular direction and so the bandwidth in either direction can be dynamically altered. This is in contrast to typical systems in which the configuration is specified and requires an operator to reconfigure the channels. By dynamically and automatically reconfiguring channels, e.g., to respond to bandwidth requirements, the direction-switchable transponder is able to employ limited data communications resources, e.g., fiber optic cables, more efficiently and thereby overall network bandwidth and latency issues.

At block 311, the routine resumes communications on previously suspended channels, e.g., to now carry data communications traffic in the opposite direction from their prior configuration.

Figure 4:
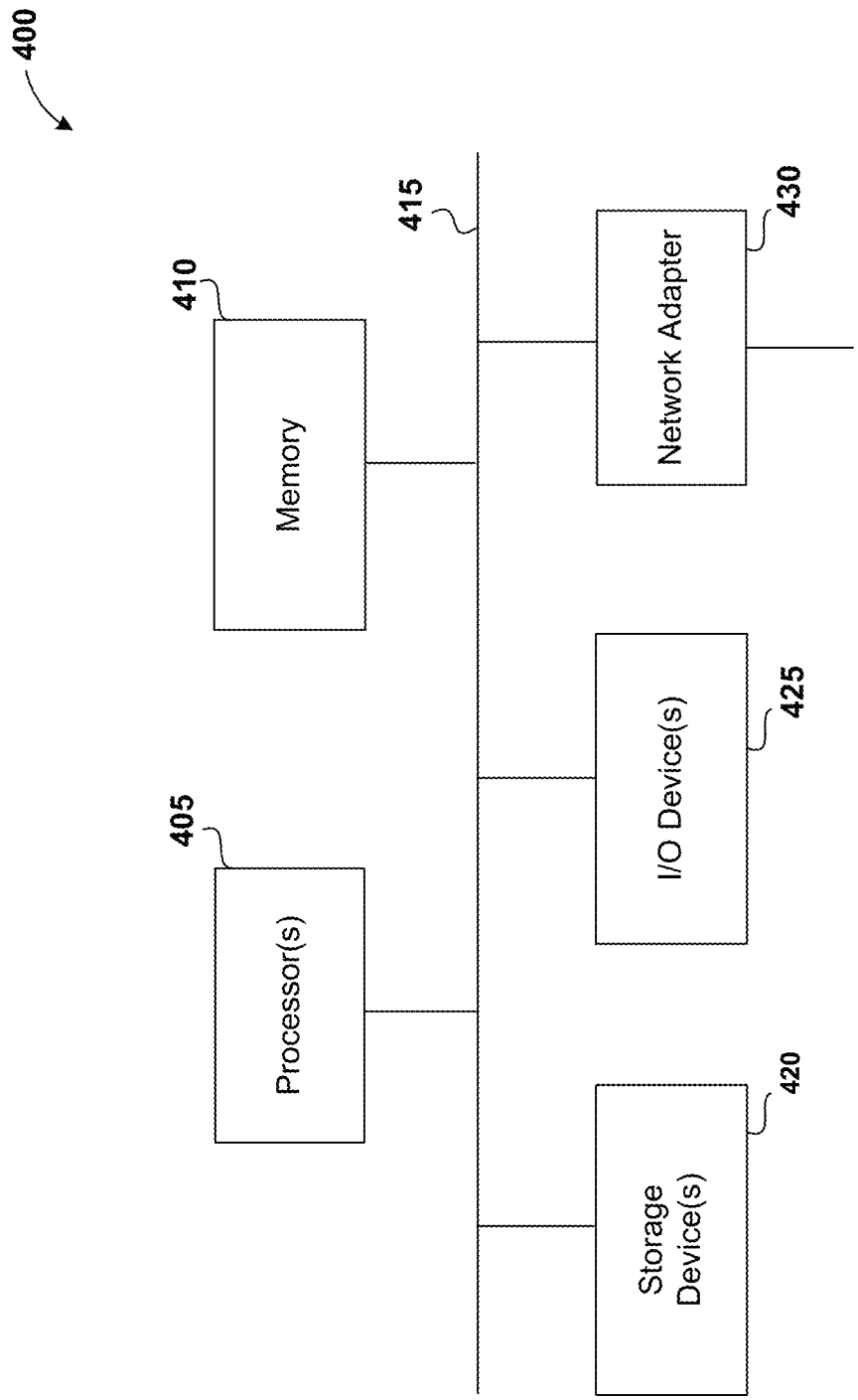
FIG. 4 is a block diagram of a server of FIG. 1, consistent with various embodiments.

FIG. 4 is a block diagram of a computing device of a data center of FIG. 1, including a computing device that may house one or more direction-switchable transponders, consistent with various embodiments. The computing system 400 may be used to implement any of the entities, components or services depicted in the examples of FIGS. 1-7 (and any other components described in this specification). The computing system 400 may include one or more central processing units ("processors") 405, memory 410, input/output devices 425 (e.g., keyboard and pointing devices, display devices), storage devices 420 (e.g., disk drives), and network adapters 430 (e.g., network interfaces) that are connected to an interconnect 415. The interconnect 415 is illustrated as an abstraction that represents any one or more separate physical buses, point to point connections, or both connected by appropriate bridges, adapters, or controllers. The interconnect 415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 410 and storage devices 420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 410 can be implemented as software and/or firmware to program the processor(s) 405 to carry out actions described above. In some embodiments, such software or firmware may be initially provided to the processing system 400 by downloading it from a remote system through the computing system 400 (e.g., via network adapter 430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing device, comprising:
   receiving a signal indicating network bandwidth requirements and a specification of a number of plurality of fiber optic channels to be reversed;
   selecting a plurality of fiber optic channels for reversing directions of flow of network traffic of the plurality of fiber optic channels, the plurality of fiber optic channels selected based on the received signal;
   suspending communications on the selected plurality of fiber optic channels prior to reconfiguring the selected plurality of fiber optic channels to reverse the directions of flow of network traffic including by requesting devices attempting to communicate via the selected plurality of fiber optic channels to move to one or more alternative fiber optic channels; and
   dynamically and automatically reconfiguring the selected plurality of fiber optic channels to reverse the directions of flow of network traffic.

2. The method of claim 1, wherein suspending communications on the selected plurality of fiber optic channels includes suspending at a transponder communications on the selected plurality of fiber optic channels in a first direction.

3. The method of claim 2, further comprising resuming communications on the selected plurality of fiber optic channels in a second direction that is opposite the first direction.

4. The method of claim 1, wherein the signal is received via a fiber optic channel.

5. The method of claim 1, wherein the signal is received via a back channel.

6. The method of claim 1, wherein the signal specifies a count of channels to be configured in a particular direction.

7. The method of claim 1, wherein the signal specifies a map of channels to be configured in a particular direction.

8. The method of claim 1, wherein the signal specifies a bandwidth required in a particular direction.

9. The method of claim 1, further comprising communicating the reconfiguration to a different direction-switchable transponder.

10. A computer program product, the computer program product being embodied in an non-transitory computer readable storage medium and comprising computer instructions for:
    receiving a signal indicating network bandwidth requirements and a specification of a number of plurality of fiber optic channels to be reversed;
    selecting a plurality of fiber optic channels for reversing directions of flow of network traffic of the plurality of fiber optic channels, the plurality of fiber optic channels selected based on the received signal;
    suspending communications on the selected plurality of fiber optic channels prior to reconfiguring the selected plurality of fiber optic channels to reverse the directions of flow of network traffic including by requesting devices attempting to communicate via the selected plurality of fiber optic channels to move to one or more alternative fiber optic channels; and
    dynamically and automatically reconfiguring the selected plurality of fiber optic channels to reverse the directions of flow of network traffic.

11. The computer program product of claim 10, wherein suspending communications on the selected plurality of fiber optic channels includes suspending at a transponder communications on the selected plurality of fiber optic channels in a first direction.

12. The computer program product of claim 10, wherein the signal specifies a bandwidth required in a particular direction.

13. The computer program product of claim 10, further comprising computer instructions for communicating the reconfiguration to a different direction-switchable transponder.

14. A system, comprising:
    a first component configured to receive a signal relating to network bandwidth requirements and a specification of a number of plurality of high speed communications channels to be reversed; and
    a second component configured to:
      select a plurality of high speed communications channels for reversing directions of flow of network traffic of the plurality of high speed communications channels, the plurality of channels selected based on the received signal;
      suspending communications on the selected plurality of high speed communications channels prior to reconfiguring the selected plurality of high speed communications channels to reverse the directions of flow of network traffic including by requesting devices attempting to communicate via the selected plurality of high speed communications channels to move to one or more alternative high speed communications channels; and
      automatically reconfigure the selected plurality of channels to reverse the directions of flow of network traffic.

15. The system of claim 14, wherein suspending communications on the selected plurality of high speed communications channels includes suspending at a transponder communications on the selected plurality of high speed communications channels in a first direction and then, after the reconfiguration of the selected high speed communications channels, resuming communications on the selected high speed communications channels in a second direction that is opposite the first direction.

16. The system of claim 14, wherein the signal is received via a fiber optic channel.

17. The system of claim 14, wherein the signal is received via a back channel.

18. The system of claim 14, wherein the signal specifies a count of channels to be configured in a particular direction or a map of channels to be configured in a particular direction.

19. The system of claim 14, wherein the signal specifies a bandwidth required in a particular direction.

20. The system of claim 14, wherein reconfiguring the plurality of channels includes communicating the reconfiguration to a different direction-switchable transponder.

21. The system of claim 14, further comprising a third component configured to receive a first wavelength signal and transmit a second, different, wavelength signal.

\* \* \* \* \*